United States Patent [19]

Sakai et al.

[11] Patent Number: 4,662,859
[45] Date of Patent: May 5, 1987

[54] RESILIENT SHAFT COUPLING DEVICE

[75] Inventors: Shoji Sakai, Nagaokakyo; Koshi Noda, Joyo; Kazuhiro Nakata; Shingo Takashima, both of Kyoto, all of Japan

[73] Assignee: Murata Kikai Kabushiki Kaisha, Kyoto, Japan

[21] Appl. No.: 732,232

[22] Filed: May 8, 1985

[30] Foreign Application Priority Data

May 15, 1984 [JP]  Japan .............................. 59-70851[U]

[51] Int. Cl.$^4$ .............................................. F16D 3/74
[52] U.S. Cl. ...................................... 464/88; 464/154; 464/178
[58] Field of Search ...................... 464/87, 88, 92, 147, 464/153, 154, 158, 170, 178, 903; 403/300, 312, 335, 336, 338, 341

[56] References Cited

U.S. PATENT DOCUMENTS

| | | | |
|---|---|---|---|
| 2,389,581 | 11/1945 | Tarr | 464/154 X |
| 2,587,365 | 2/1952 | Mize | 464/170 X |
| 2,655,798 | 10/1953 | Neher | 464/154 |
| 2,749,191 | 6/1956 | Cole et al. | 464/178 X |
| 2,899,807 | 8/1959 | Schwettman | 464/154 |
| 3,117,430 | 1/1964 | Mueller | 464/178 X |
| 3,313,124 | 4/1967 | Filepp | 464/88 X |
| 3,362,191 | 1/1968 | Louette | 464/88 X |
| 3,874,194 | 4/1975 | Filepp et al. | 464/154 |

FOREIGN PATENT DOCUMENTS 548802 11/1959 Belgium ................................ 464/88

Primary Examiner—Daniel P. Stodola
Attorney, Agent, or Firm—Barnes, Kisselle, Raisch, Choate, Whittemore & Hulbert

[57] ABSTRACT

A coupling device comprising two bosses for respectively inserting therein each end of two shafts to be connected, a coupling member which is made of a resilient material and covers the bosses and a casing to fit the coupling member therein. The bosses have a plurality of toothed portions formed on outer periphery thereof and the coupling member has toothed portions identical in number and shape to the toothed portions of the bosses at inner periphery thereof so that the two bosses and coupling member are engaged with each other.

1 Claim, 7 Drawing Figures

RESILIENT SHAFT COUPLING DEVICE

BACKGROUND OF THE INVENTION

1. Field of the Invention

The present invention relates to couplings for connecting one shaft with the other shaft and more particularly, to a coupling adapted to connect roller shafts in a drafting means for use in a high-speed spinning machine.

2. Prior Art

A spinning machine for producing spun yarn from a supply of sliver comprises a drafting section drafting the sliver, a twisting section giving twists thereto, and a take-up section. In a spinning factory, a plurality of spinning machines constructed as above are disposed in parallel relation to each other.

In said plurality of spinning machines arranged in parallel, only one driving shaft is employed for the respective drafting rollers and rollers adapted to take-up the spun yarn from the twisting section. This is due to the fact that it is not economical to provide a driving source for each disposed machine. For example, in a three-roll drafting means having two pairs of back rollers, middle rollers and front rollers, only one driving shaft is provided at the front rollers for each disposed machine and the respective rollers are driven for rotation by only one driving source.

It will be noted that the use of a long shaft may result in difficulty in its transportation, arrangement, or removal and rearrangement when floating fibers are attached to part of said shaft. It is for these reasons that generally, a plurality of short shafts are connected to form a long shaft in each disposed machine.

Heretofore, there has been proposed a screwed fitting method as one of means for connecting the shafts as shown in FIG. 7. That is, an end (a) of one shaft in the form of an internal thread is threaded onto an end (b) of the other shaft in the form of an external thread so as to connect the shaft with the other shaft. However, accuracy in thread cutting of said external and internal threads is limited and thus, these threads may not completely be threaded together, no matter how much its accuracy is improved. Accordingly, the center of rotation of the shafts is likely to shift or move at a threaded portion, or a portion where the shafts are connected and the speed of rotation of the rollers fitted on the shafts may vary upon occurrence of such movement. Variation in said speed of rotation causes irregularity of drafting and unevenness of spun yarn in thickness. That is to say, as the peripheral speed of the rollers is high, the rate of drafting becomes relatively high and thin span yarn results due to excess drafting. On the contrary, as said speed of rotation thereof is low, the rate of drafting becomes relatively low. Thus, thick span yarn results.

Further, a metal joint may be employed to hold ends of two shafts. Upon use of said metal joint, deformation of the shafts due to its movement or the like barely occurs. On the other hand, connection per se is difficult to be effected. In other words, when a plurality of arranged spinning machines are installed in a factory, slight error of arrangement may occur. The joint is required to allow said error to a certain extent. However, the metal joint provides no such allowance. Also, even if the connection is effected, the position of the spinning machine may slightly shift due to vibrations of the installation floor. In such a case, disorder of the drafting means may results. Therefore, the joint needs to have cushioning effect.

On the other hand, a resilient joint may be used to hold the ends of two shafts. The above-mentioned cushioning effect is satisfied by the resilient joint. However, rotational torque may partly be absorbed thereby and as a result, the speed of rotation of the shafts becomes uneven. Thus, irregularity of drafting and unevenness of spun yarn in thickness may result as well as the above-mentioned screwed thread means.

SUMMARY OF THE INVENTION

An object of the present invention is to provide a coupling device wherein a center of rotation of shafts does not shift or move at a portion where the shafts are connected in a high speed operation.

Another object of the present invention is to provide a coupling device wherein the speed of rotation of the rollers fitted on the each connected shafts does not vary.

Still another object of the present invention is to provide a coupling device of which joint has cushioning effect.

According to the present invention, there is provided a coupling wherein shafts are inserted into two substantially cylindrical bosses having on its outer periphery a plurality of externally toothed portions for connecting purposes, said two bosses are covered by a substantially cylindrical resilient coupling member having at its inner periphery internally toothed portions identical in number and shape to the externally toothed portions for fitting purposes, and said coupling member is fitted in a rigid casing having therewithin a cavity, the inner diameter of which being equal to the outer diameter of said coupling member.

BRIEF DESCRIPTION OF THE DRAWINGS

FIG. 2 is a plan view, partly sectioned, of the coupling;

FIG. 3 is a side view of the coupling, partly sectioned, taken in line III—III of FIG. 2;

FIG. 4 is a perspective view of a boss;

FIG. 5 is a perspective view of a coupling member;

FIG. 6 is a perspective view of a casing; and

DETAILED DESCRIPTION OF THE INVENTION

The invention will hereinbelow be described by way of example with reference to the drawings.

Figure 1:
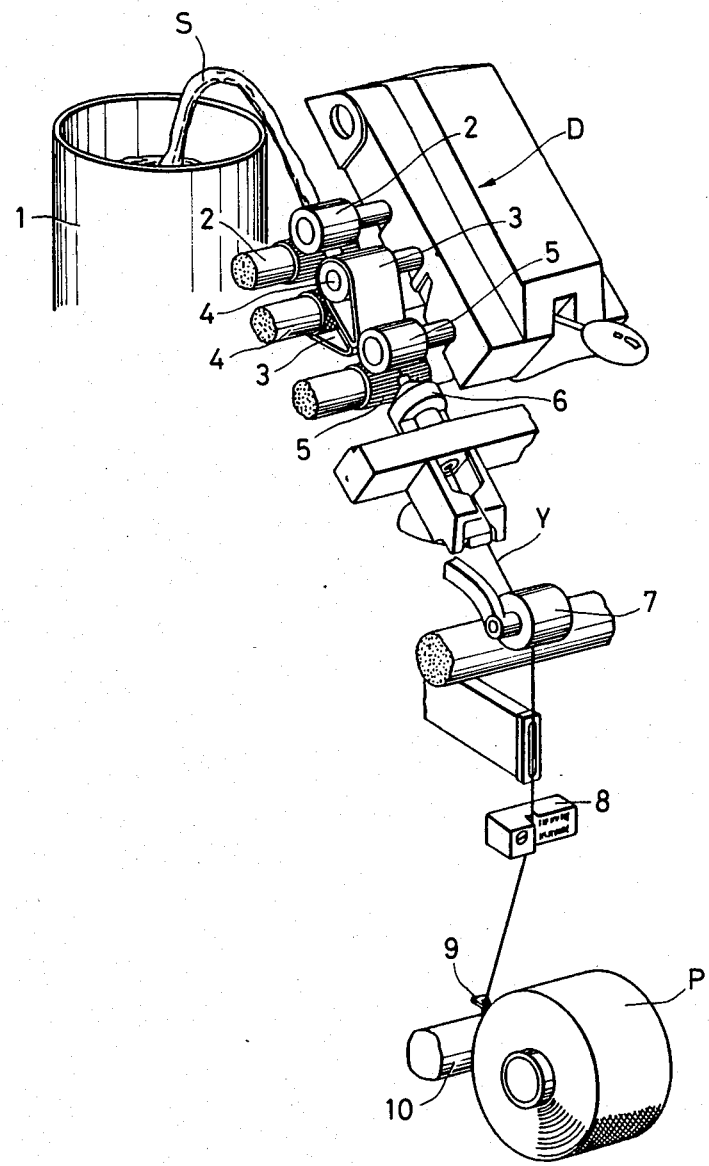
FIG. 1 is a schematic view of an air-operated spinning machine to which the present invention is applied.

FIG. 1 is a schematic view of an air-operated spinning machine, a plurality of such spinning machines are disposed in a factory. Sliver S contained in a cylindrical can 1 is supplied to a drafting means D. The drafting means D comprises a pair of back rollers 2, a pair of middle rollers 4 having an apron 3, and a pair of front rollers 5 respectively provided along the path of the sliver S. The peripheral speed of each of the back rollers 2, the middle rollers 4 and the front roller 5 is greater in that order. The sliver S is supplied forward while being drafted under pressure by and between the respective pairs of rollers. After the sliver S passes through the drafting means D, it is supplied to a spinning nozzle 6. The sliver S is twisted therein under the influence of swirling air flow and is taken out by a delivery roller 7 as a spun yarn Y. Thereafter, it is wound on a package P via a yarn clearer 8, a traverse guide 9 and a friction roller 10.

Figure 2:
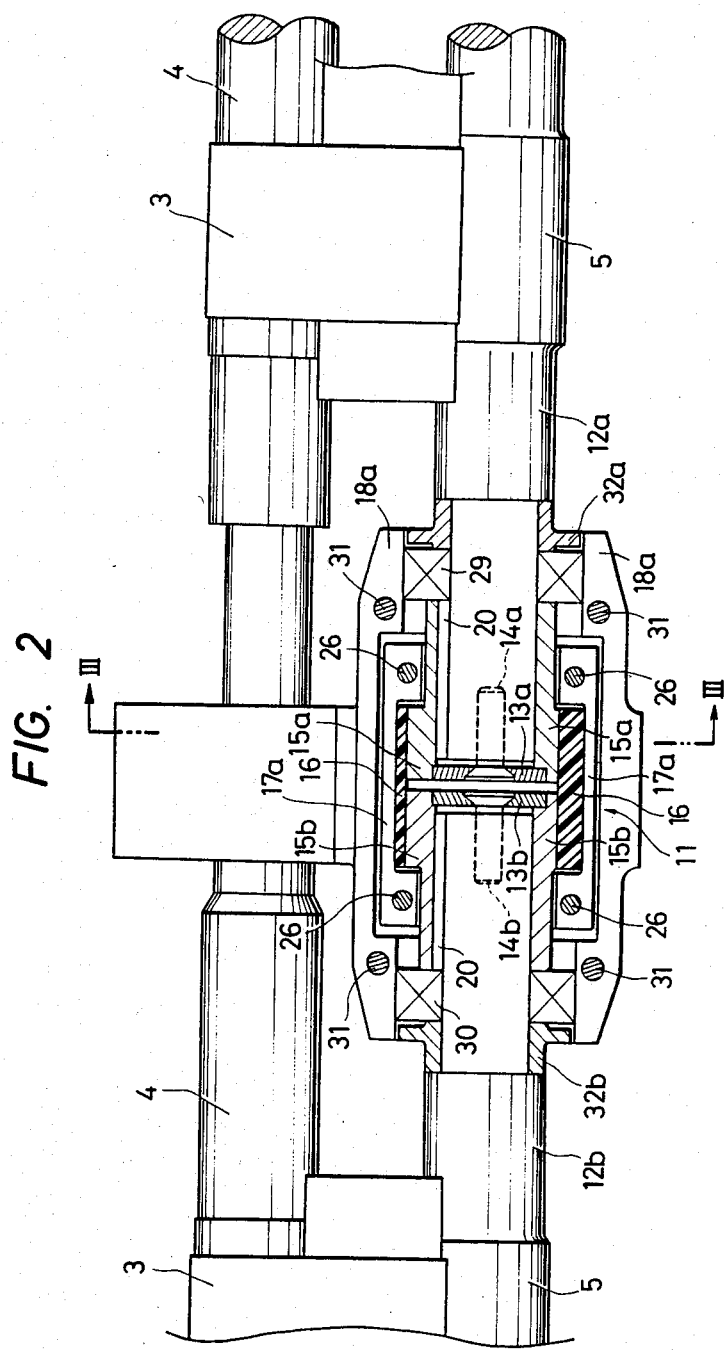
FIG. 2 and FIG. 3 are respectively illustrate a coupling according to the invention applied to a joint portion of shafts of front rollers in the air-operated spinning machine of FIG. 1.
Figure 3:
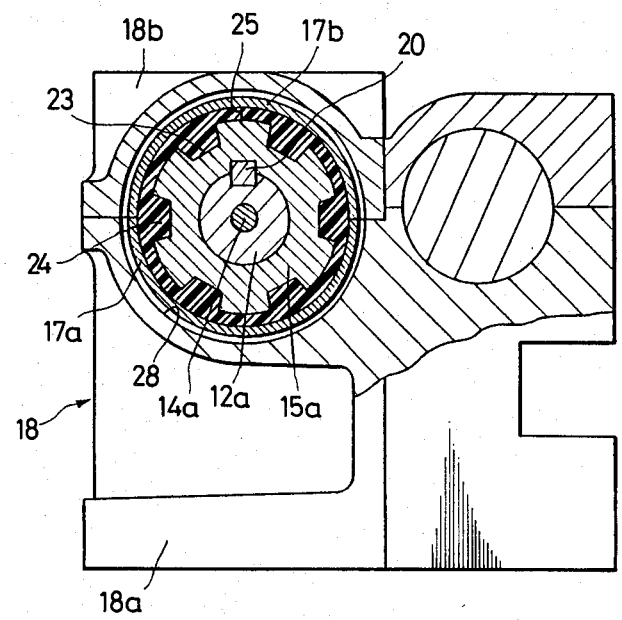
Figure 5:
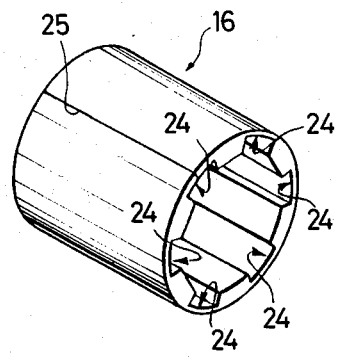
FIG. 4 through FIG. 6 illustrate the respective parts for use in the coupling according to the present invention.
Figure 4:
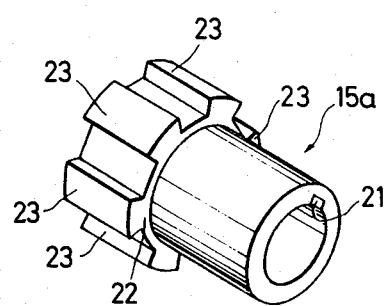
Figure 6:
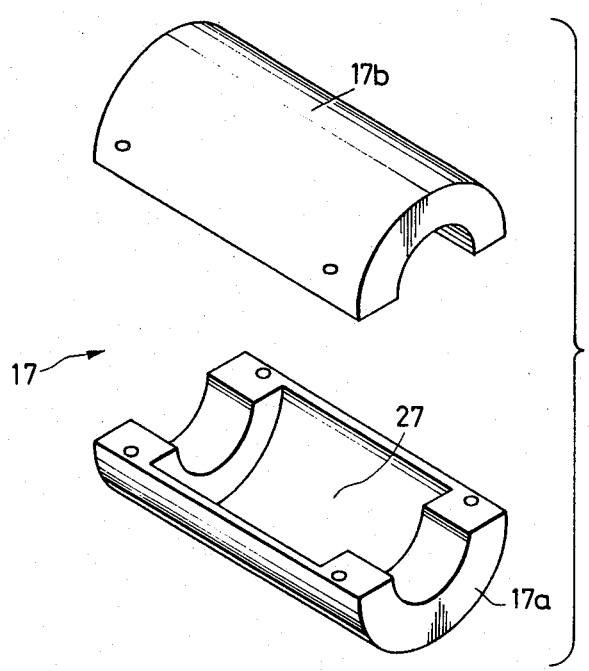

A coupling according to the present invention will now be described with reference to FIG. 2 to FIG. 6. FIG. 2 and FIG. 3 illustrate said coupling which is applied to a joint portion of shafts of the front rollers 5. FIG. 4 through FIG. 6 illustrate the respective parts of said coupling.

Front roller shaft 12a, 12b respectively include stepped portions and washers 13a, 13b are threadably mounted to the end surfaces of said shafts as at 14a, 14b. Said two shafts 12a, 12b are connected together by a coupling 11. Said coupling 11 comprises bosses 15a, 15b, a coupling member 16 and a casing 17. The respective parts will now be described in more detail according to mounting order of said coupling 11.

First, the shaft 12a is inserted into the boss 15a. Said boss 15a is stepped as at 22 and is of cylindrical configuration as shown in FIG. 4. Formed at the inner periphery of said boss 15a is a keyway 21 identical in shape to a key 20 of the shaft 12a which is received in the keyway. Six identical externally toothed portions 23 are formed at equal intervals on the outer periphery of the raised portion of the boss 15a. The shaft 12a is inserted into the boss 15a in such a manner that the key 20 of the shaft 12a is fitted in the keyway 21. The shaft 12b and the boss 15b are identical in shape to the shaft 12a and the boss 15a respectively. The shaft 12b is inserted in a similar manner to the boss 15b.

Next, the bosses 15a, 15b are covered by the substantially cylindrical coupling member 16 having internally toothed portions 24 identical in shape to the externally toothed portions 23 of the boss 15a as shown in FIG. 5 for fitting purposes. Said coupling member 16 is made of resilient material such as polyurethane and the like. One portion of said coupling member 16 is cut as at 25 as shown in FIG. 5. Said coupling member 16 is mounted on the bosses 15a, 15b in such a manner that the externally toothed portions 23 are fitted in the internally toothed portions 24. Such mounting of the coupling member 16 on the bosses 15a, 15b may be effected by spreading the coupling member 16 since the coupling member 16 is cut up at 25.

The casing 17 is intended to hold the shafts 12a, 12b, the bosses 15a, 15b and the coupling member 16. The casing 17 is formed to cylindrical configuration in such a manner that two semi-cylindrical casing members 17a, 17b as shown in FIG. 6 are threaded together as at 26 as shown in FIG. 2. Formed within the casing 17 is a cavity 27, the inner diameter of which being equal to the outer diameter of the coupling member 16. Namely, the inner periphery of each of said casing members 17a, 17b is of stepped construction and the lower parts of the stepped portions are referred to as the cavity 27. Said cavity 27 is adapted to receive the coupling member 16 and the two casing members 17a, 17b are threaded together. Since the outer diameter of the coupling member 16 is equal to the inner diameter of the cavity 27, complete seal is effected between the coupling member 16 and the casing 17.

Connection of the shaft 12a with the shaft 12b is thus completed and the casing 17 will now be arranged in a bearing housing 18. Said bearing housing 18 comprises a lower housing 18a and a housing cover 18b. The casing 17 in which the shafts 12a, 12b, the bosses 15a, 15b and the coupling member 16 are sealingly contained, is fitted in a concaved slot 28 of the lower housing 18a. Bearings 29, 30 previously fitted to the shafts 12a, 12b are fitted in the stepped portion of the lower housing 18a and then, the housing cover 18b is threaded onto the lower housing 18a. The casing is suspended in the bearing housing 18 and the shafts 12a, 12b are journaled by the bearings 29, 30 respectively. Reference numerals 32a, 32b are ring-like spacers previously fitted on the shafts 12a, 12b for positioning the casing 17 within the bearing housing 18 and preventing intrusion of dust into said housing 18. It will be noted that the lower housing 18a is fixedly mounted to the spinning machine.

With the above arrangement, rotation of the shafts 12a, 12b causes the bosses 15a, 15b in the casing 17, the coupling member 16 and the casing 17 to rotate and thus, rotation is transmitted from the shaft to the other shaft.

Although there is illustrated the coupling 11 used to connect the shaft 12a with the shaft 12b of the front roller 5 in the above embodiment, the present invention is not limited thereto. However, the speed of rotation of the other two rollers is remarkably lower than that of the front roller and conventional screwed thread means can no doubt be applied to those rollers. Further, although six external threaded portions are formed on each boss, it is to be noted, of course, that these portions are not limited to six in number. According to the arrangement of the coupling of the present invention, cushioning effect is obtained by the resilient coupling member and at the same time, deformation of a joint portion between the shafts due to movement barely occurs under the influence of the rigid casing. Therefore, slight shifting of a spinning machine can be allowed under such cushioning effect. Also, irregularity of drafting and uneveness of spun yarn in thickness due to said deformation are prevented. Further, since the resilient coupling member is completely sealed by the bosses and the casing, the coupling member is not subject to deformation. Thus, uneven rotational speeds of the shafts, referred to as rotational vibrations, as well as uneven thickness of the spun yarn is eliminated. Still further, the externally toothed portions of the bosses are fitted in the internally toothed portions. Accordingly, slippery between the bosses and the coupling member is eliminated and thus, rotation is positively transmitted.

Figure 7:
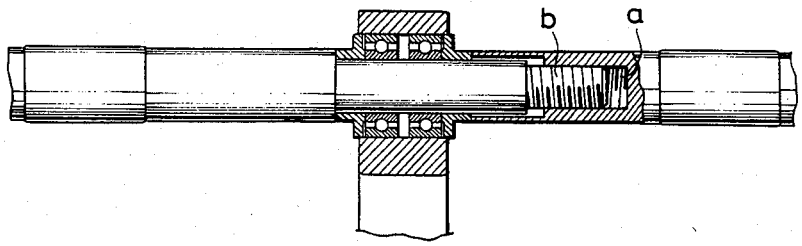
FIG. 7 illustrates a front roller employing a conventional screwed thread method.

The following table shows the comparative value of each of movement and fiber properties with respect to the front bottom roller employing the coupling according to the present invention and the front bottom roller adopting a conventional screwed thread means as shown in FIG. 7. The roller shaft is connected at 30 points, and is 13 m in length as a whole and 25 mm in diameter. Also, the number of arranged spindles is 60. The movement is measured with respect to eccentricity of the roller, by means of a dial gauge. The fiber properties are measured with respect to fiber of 1000 m produced by the respective rollers. The movement and fiber properties according to the present invention and those according to the prior art are evaluated by a coefficient of variation (CV%).

TABLE

| Spindle No. | Movement (mm) | | Yarn Properties | | | | | | | |
|---|---|---|---|---|---|---|---|---|---|---|
| | Prior Art | Present invention | Prior Art | | | | Present Invention | | | |
| | | | CV % | Thin | Thick | Neps | CV % | Thin | Thick | Neps |
| 1 | 0.025 | 0.005 | 16.5 | 135 | 20 | 951 | 15.5 | 82 | 12 | 767 |
| 2 | 0.015 | 0.005 | 17.0 | 140 | 15 | 896 | 15.5 | 82 | 6 | 825 |
| 3 | 0.020 | 0.006 | 16.0 | 132 | 9 | 843 | 15.0 | 66 | 5 | 660 |
| 4 | 0.025 | 0.005 | 15.0 | 82 | 9 | 762 | 15.0 | 66 | 5 | 774 |
| 5 | 0.040 | 0.009 | 15.0 | 80 | 2 | 864 | 15.0 | 88 | 6 | 802 |
| 6 | 0.050 | 0.010 | 18.0 | 371 | 18 | 1167 | 16.0 | 154 | 14 | 818 |
| 31 | 0.060 | 0.003 | 16.0 | 144 | 5 | 1017 | 15.5 | 99 | 7 | 764 |
| 32 | 0.025 | 0.010 | 15.5 | 96 | 4 | 877 | 15.5 | 87 | 5 | 792 |
| 33 | 0.030 | 0.005 | 15.0 | 64 | 6 | 723 | 15.5 | 79 | 7 | 703 |
| 34 | 0.015 | 0.006 | 15.0 | 92 | 3 | 894 | 15.0 | 64 | 9 | 697 |
| 35 | 0.010 | 0.005 | 18.0 | 95 | 5 | 789 | 15.0 | 68 | 8 | 672 |
| 36 | 0.015 | 0.008 | 15.0 | 77 | 9 | 753 | 15.0 | 53 | 5 | 632 |
| 55 | 0.015 | 0.005 | 15.0 | 92 | 8 | 878 | 15.5 | 33 | 9 | 751 |
| 56 | 0.030 | 0.006 | 16.5 | 139 | 10 | 918 | 15.0 | 63 | 6 | 788 |
| 57 | 0.055 | 0.010 | 17.0 | 208 | 20 | 977 | 15.5 | 104 | 14 | 729 |
| 58 | 0.060 | 0.003 | 22.0 | 374 | 53 | 928 | 19.5 | 286 | 37 | 777 |
| 59 | 0.045 | 0.011 | 16.0 | 125 | 2 | 870 | 15.5 | 89 | 6 | 767 |
| 60 | 0.045 | 0.010 | 18.0 | 328 | 15 | 1109 | 15.5 | 79 | 7 | 735 |
| Average | 0.032 | 0.007 | 16.2 | 141 | 9 | 888 | 15.3 | 83 | 8 | 747 |
| CV % | 51.9% | 38.4% | 6.6% | | | | 1.9% | | | |

What is claimed is:

1. A resilient coupling device for connecting two shafts of a draft device for a spinning machine comprising two bosses for respectively receiving the ends of said two shafts to be connected, a tubular coupling member, said two bosses being non-rotatably received in the ends of said tubular coupling member, said coupling member being made of resilient polyurethane having a cylindrical outer surface, and a tubular casing being made of a rigid material and having a cylindrical recess in the inner wall thereof between its ends of a diameter equal to the diameter of the cylindrical outer surface of said coupling member, said coupling member being received in the recess in the inner wall of said casing with its cylindrical outer surface in contact with the wall of said recess, the ends of said coupling member being closely confined between the ends of said recess, said bosses having a plurality of toothed portions on the outer periphery thereof and said coupling member having toothed portions on the inner periphery thereof identical in number and shape to the toothed portions of said bosses and interengaged therewith, said shafts to be connected being supported by bearings within a bearing house and said casing being suspended in said bearing house, and ring-like spacers on said shafts positioning said casing within said bearing house, said bearing house being sealed by said spacers, said coupling member being longitudinally split to permit it to be spread open for the lateral insertion of said two bosses during assembly, and said casing comprising two semi-cylindrical casing members releasably secured together.

* * * * *